US008879246B2

(12) United States Patent
Fahey et al.

(10) Patent No.: US 8,879,246 B2
(45) Date of Patent: Nov. 4, 2014

(54) PERIPHERAL DATA STORAGE DEVICE

(76) Inventors: James T. Fahey, San Francisco, CA (US); Michael Page McGirr, Lafayette, CA (US)

( * ) Notice: Subject to any disclaimer, the term of this patent is extended or adjusted under 35 U.S.C. 154(b) by 188 days.

(21) Appl. No.: 13/620,724

(22) Filed: Sep. 15, 2012

(65) Prior Publication Data

US 2013/0010421 A1     Jan. 10, 2013

Related U.S. Application Data

(63) Continuation-in-part of application No. 13/158,809, filed on Jun. 13, 2011, now abandoned, which is a continuation-in-part of application No. 12/581,768, filed on Oct. 19, 2009, now Pat. No. 8,228,670.

(60) Provisional application No. 61/106,809, filed on Oct. 20, 2008.

(51) Int. Cl.
*G06F 1/16*     (2006.01)

(52) U.S. Cl.
CPC ...... *G06F 1/1632* (2013.01); *G06F 2200/1635* (2013.01)
USPC .............. 361/679.32; 361/679.31; 361/679.4; 361/679.41; 455/556.1; 455/558; 312/223.1; 312/223.2

(58) Field of Classification Search
USPC ..................................................... 361/679.32
See application file for complete search history.

(56) References Cited

U.S. PATENT DOCUMENTS

| 5,227,953 | A | * | 7/1993 | Lindberg et al. | ......... 361/679.41 |
|---|---|---|---|---|---|
| 5,265,951 | A | * | 11/1993 | Kumar | ......... 312/223.2 |
| 6,931,266 | B2 | * | 8/2005 | Miyoshi et al. | ......... 455/572 |
| 7,647,129 | B1 | * | 1/2010 | Griffin, Jr. | ......... 700/94 |
| 7,660,601 | B2 | * | 2/2010 | Janik et al. | ......... 455/556.1 |
| 8,000,820 | B2 | * | 8/2011 | Griffin, Jr. | ......... 700/94 |
| 8,228,670 | B2 | * | 7/2012 | Fahey et al. | ......... 361/679.32 |
| 2002/0163780 | A1 | * | 11/2002 | Christopher | ......... 361/686 |
| 2003/0016487 | A1 | * | 1/2003 | Tung-Chieh et al. | ......... 361/679 |
| 2005/0002160 | A1 | * | 1/2005 | Chen et al. | ......... 361/683 |
| 2005/0181756 | A1 | * | 8/2005 | Lin | ......... 455/344 |
| 2007/0260798 | A1 | * | 11/2007 | Griffin, Jr. | ......... 710/303 |
| 2010/0169531 | A1 | * | 7/2010 | Bae | ......... 710/303 |

* cited by examiner

*Primary Examiner* — Anthony Q Edwards

(57) ABSTRACT

A peripheral data storage device for IPHONE mobile phone and IPOD media player devices having an encasement containing a system of electronic circuits which communicates with the IPHONE mobile phone or IPOD media player by means of a host software system and a device software system. The device also has a charge pass through connector and optional card slots. Various views of the device are shown in FIGS. 1-5.

18 Claims, 2 Drawing Sheets

PERIPHERAL DATA STORAGE DEVICE

CROSS-REFERENCE TO RELATED APPLICATIONS

This application is a continuation in part of application Ser. No. 13/158,809 filed 13 Jun. 2011, which is a continuation in part of application Ser. No. 12/581,768 filed 19 Oct. 2009, now U.S. Pat. No. 8,228,670, which claims priority from Provisional Application No. 61/106,809 filed 20 Oct. 2008. Thus this application claims benefit of priority for the filing date of the provisional application No. 61/106,809 for all subject matter common to both applications.

FEDERALLY SPONSORED RESEARCH

Not Applicable

SEQUENCE LISTING OR PROGRAM

Not Applicable

BACKGROUND

1. Field

This application relates to IPHONE mobile phone and IPOD media player peripherals, specifically to a peripheral device which stores data.

2. Prior Art

Data-intensive applications for the IPHONE mobile-phone and IPOD media player such as PodCasts have increased memory usage at a great rate. Thus, many users are exhausting the built-in memory. These users seek additional memory for their devices. There is no peripheral device that provides a storage solution for these IPOD media player and IPHONE mobile phone users.

DRAWINGS

Figures

REFERENCE NUMERALS

Figure 1:
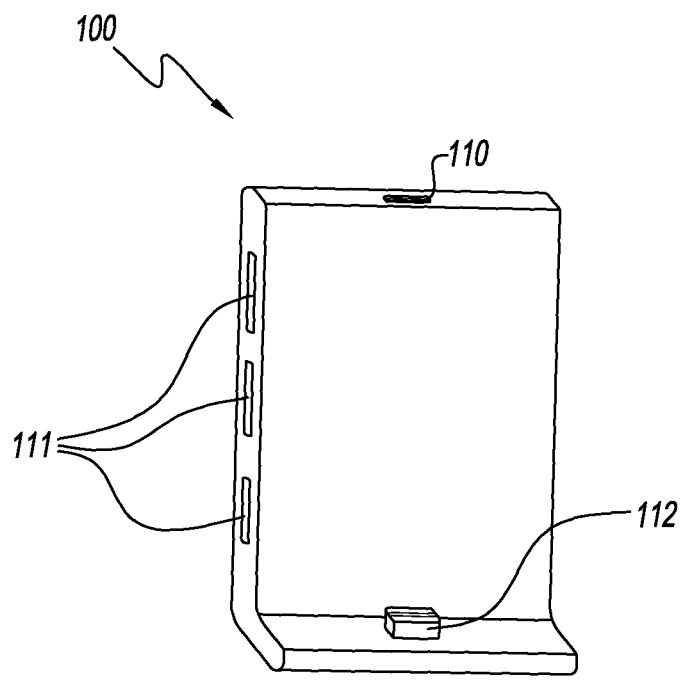
FIG. 1 shows the device disconnected from the IPHONE mobile phone, with dock pass-through connector, optional microSD slots, and dock connector for connection to IPHONE mobile phone.

100 device
110 dock pass-through connector
111 optional microSD slots
112 8 pin dock connector for connection to the IPHONE mobile phone

DETAILED DESCRIPTION

Hardware Form Factor (Encasement)
The Form Factor (Encasement) is shown in the drawings:

FIG. 1 shows the device disconnected from the IPHONE mobile phone, with dock pass-through connector, optional microSD slots, and 8-pin dock connector for connection to IPHONE mobile phone.

Figure 2:
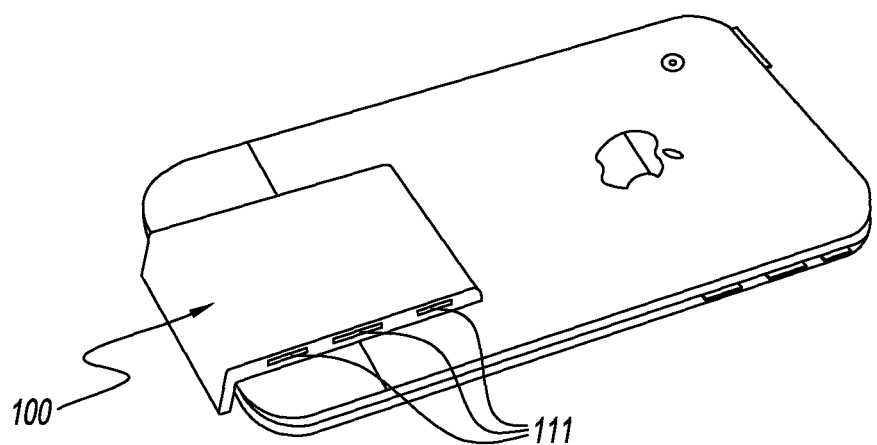
FIG. 2 is a view of the back side of the IPHONE mobile phone with the device connected, showing the optional microSD slots.

FIG. 2 is a view of the back side of the IPHONE mobile phone with the device connected, showing the optional microSD slots.

Figure 3:
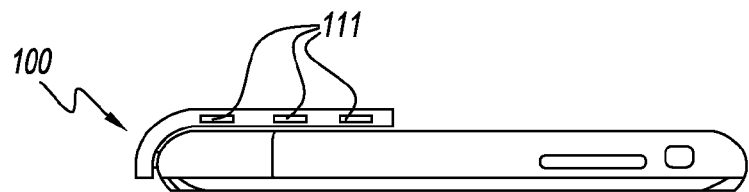
FIG. 3 is a side view of the device on the IPHONE mobile phone, showing the optional microSD slots
Figure 4:
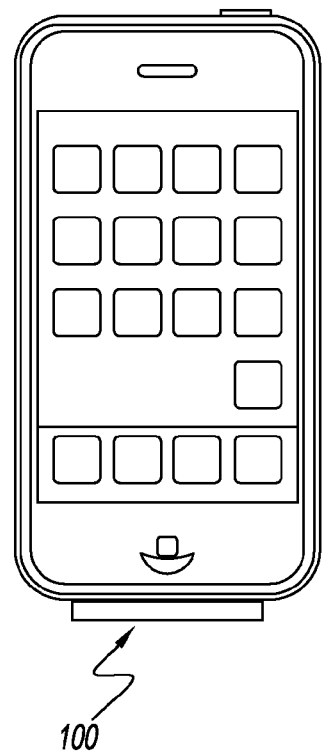
FIG. 4 is a frontal view of the IPHONE mobile phone with the device attached.

FIG. 3 is a side view of the device on the IPHONE mobile phone, showing the optional microSD slots FIG. 4 is a frontal view of the IPHONE mobile phone with the device attached.

Figure 5:
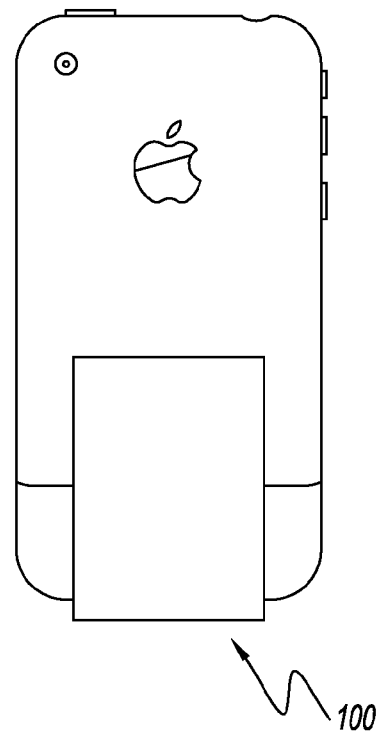
FIG. 5 is a rear view of the IPHONE mobile phone with the device attached.

FIG. 5 is a rear view of the IPHONE mobile phone with the device attached.

Hardware Contents (System of Electrical Circuits)

The contents of the above packaging will contain any number of the following electrical components as well as any other electrical components which might be necessary for operation:
  Memory Components
  Memory Cards
  Controllers
  PCBs
  Interconnect
  Capacitors
  Oscillators
  Device Software The software of the storage device will contain any number of the following items as well as any other software that might be necessary for operation of the storage device:
  Memory Management Software (Error Correction, Wear Leveling, etc.)
  Custom Content (Data, Video, Images, Music, Documents, etc.)
  Security
  Digital Rights Management
  Host (IPOD Media Player or IPHONE Mobile Phone) Software The software of the host (IPOD media player or IPHONE mobile phone) will contain any number of the following items as well as any other software that might be necessary for operation of the host with the storage device:
  Host Application Interface Software
  Data Translation Software
  Memory Management Software
  Content
  Content Enabling Software
  Security
  Digital Rights Management

OPERATION

In operation one uses the storage device 100 as an attachment to the IPHONE mobile phone or IPOD media player. The storage device and host software allow the user to record content, store it on the storage device, retrieve the content in a secure way, and display/play the content on the host device. The user may install the host software by downloading it from the Internet. Or, the software may come pre-loaded on either the host or the storage device. Multiple hosts will be able to operate with the same card (device) in accordance with security and digital rights management.

The Pass-through Connector 110 allows the user to connect additional devices (such as chargers) to the IPHONE mobile phone or IPOD media player while keeping the storage device attached and operational.

The optional microSD slots 111 allow the user to insert microSD cards into the storage device and record content, store it on the microSD cards, retrieve the content from the microSD cards in a secure way, and display/play the content from the microSD cards on the host IPOD media player or IPHONE mobile phone device.

ADVANTAGES

From the description above, it is evident that users who need additional memory for their IPHONE mobile phone or IPOD media player now have a peripheral storage device which allows the user to record content, store it on the storage device, retrieve the content in a secure way, and display/play the content on the host device. Previously, these users had no way of extending the memory capabilities of their IPHONE mobile phone or IPOD media player.

CONCLUSION, RAMIFICATIONS, AND SCOPE

Accordingly, the reader will see that content makers (makers of video, music, maps, etc.) application makers (makers of games, GPS, live broadcasting, etc.) are no longer limited by the hardware present on the IPHONE mobile phone and IPOD media player. Instead, content makers and application makers are now liberated to fully leverage the IPHONE mobile phone and IPOD media player platform. Users, too, are freed from the limitations inherent to their IPHONE mobile phone or IPOD media player device. As Moore's law continues to enable more and more memory, controller, and data transmission speed, and greater software power for this peripheral device, there is virtually no limitation to the types of content and applications that can be used with the IPHONE mobile phone and IPOD media player. The devices that have changed the world have now reached their maximum potential to content makers, application makers, and users alike!

We claim:

1. A peripheral storage device for a computing device having a 8 pin connector, said peripheral storage device comprising: (a) an encasement for electronic circuits, (b) a system of electronic circuits mounted inside said encasement, (c) a device software means inside said system of electronic circuits for transmitting and receiving data to and from said computing device, said computing device including a host software means for transmitting and receiving data to and from said system of electronic circuits, and (d) said encasement having a vertical rear wall and a horizontal base attached to said vertical rear wall, wherein said horizontal base includes a 8 pin connector to mate with said connector of said computing device, whereby said peripheral storage device provides said computing device with direct access to additional incremental storage beyond that built in said computing device.

2. The peripheral storage device of claim 1 wherein said encasement has a pass through connector for connection with said computing device peripheral connections such as a charger.

3. The peripheral storage device of claim 1 wherein said system of electronic circuits includes a memory card or a plurality of memory cards.

4. The peripheral storage device of claim 1 wherein said encasement includes a slot or a plurality of slots for connection to a memory card or a plurality of memory cards.

5. The peripheral storage device of claim 1 wherein said system of electronic circuits includes a controller for the transmission and reception of data to and from said computing device wirelessly.

6. The peripheral storage device of claim 1 wherein said encasement includes a 8 pin dock connector for transmission and reception of data to and from said computing device directly.

7. The peripheral storage device of claim 1 wherein said system of electronic circuits includes a transmitter for the transmission and reception of data to and from said computing device wirelessly and said encasement includes a 8 pin dock connector for transmission and reception of data to and from said computing device directly.

8. The peripheral storage device of claim 1 wherein said computing device is an Apple iPod™ media player.

9. The peripheral storage device of claim 1 wherein said computing device is an Apple iPhone™ mobile phone.

10. A method of expanding the storage of a computing device having a 8 pin connector comprising: (a) providing an encasement for electronic circuits, said encasement having a vertical rear wall and a horizontal base attached to said vertical rear wall, wherein said horizontal base includes a 8 pin connector to mate with said connector of said computing device, (b) mounting a system of electronic circuits inside said encasement, (c) loading a device software means into the said system of electronic circuits for transmitting and receiving data to and from said computing device, and (d) loading a host software means into said computing device for transmitting and receiving data to and from said system of electronic circuits, whereby said computing device has direct access to additional incremental storage beyond that built in said computing device.

11. The method of claim 10 wherein said encasement has a pass through connector for connection with said computing device peripheral connections such as a charger.

12. The method of claim 10 wherein said system of electronic circuits includes a memory card or a plurality of memory cards.

13. The method of claim 10 wherein said encasement includes a slot or a plurality of slots for connection to a memory card or a plurality of memory cards.

14. The method of claim 10 wherein said system of electronic circuits includes a controller for the transmission and reception of data to and from said computing device wirelessly.

15. The method of claim 10 wherein said encasement includes a 8 pin dock connector for transmission and reception of data to and from said computing device directly.

16. The method of claim 10 wherein said system of electronic circuits includes a transmitter for the transmission and reception of data to and from said computing device player wirelessly and said encasement includes a 8 pin dock connector for transmission and reception of data to and from said computing device directly.

17. The method of claim 10 wherein said computing device is an Apple iPod™ media player.

18. The method of claim 10 wherein said computing device is an Apple iPhone™ mobile phone.

* * * * *